United States Patent [19]
Larsen et al.

[11] Patent Number: 5,948,566
[45] Date of Patent: Sep. 7, 1999

[54] METHOD FOR MAKING LEAD-ACID GRIDS AND CELLS AND BATTERIES USING SUCH GRIDS

[75] Inventors: Steven R. Larsen, Oakdale; Andrew Foote, St. Paul, both of Minn.

[73] Assignee: GNB Technologies, Inc., Mendota Heights, Minn.

[21] Appl. No.: 08/923,341

[22] Filed: Sep. 4, 1997

[51] Int. Cl.⁶ ...................................................... H01M 4/72
[52] U.S. Cl. ........................... 429/225; 429/233; 429/242; 429/245; 429/226; 29/623.5; 29/2
[58] Field of Search .................... 429/245, 246, 429/242

[56] References Cited

U.S. PATENT DOCUMENTS

| | | | |
|---|---|---|---|
| 3,789,909 | 2/1974 | Smith | 164/87 |
| 3,789,910 | 2/1974 | Matter et al. | 164/121 |
| 3,858,642 | 1/1975 | Battiston et al. | 164/276 |
| 4,297,866 | 11/1981 | Sakauye et al. | 72/186 |
| 4,315,356 | 2/1982 | Laurie et al. | 29/6.1 |
| 4,455,724 | 6/1984 | Sperling et al. | 29/2 |
| 4,629,516 | 12/1986 | Myers | 148/11.5 R |
| 4,753,688 | 6/1988 | Myers | 148/11.5 R |
| 5,434,025 | 7/1995 | Rao et al. | 429/245 |
| 5,462,109 | 10/1995 | Vincze et al. | 164/479 |
| 5,691,087 | 11/1997 | Rao et al. | 429/245 |
| 5,762,654 | 6/1998 | Kump et al. | 29/623.5 |

*Primary Examiner*—Maria Nuzzolillo
*Assistant Examiner*—Angela J. Martin
*Attorney, Agent, or Firm*—Leydig, Voit & Mayer, Ltd.

[57] ABSTRACT

The use of a continuous process for making a directly cast strip to provide a thickness satisfactory for industrial cells and batteries for stationary and motive power applications is disclosed, the thickness of the strip being at least 0.060 inch, and the process providing a visually crack-free surface in the transverse direction of the directly cast strip, the strip being lead or a lead-based alloy, such as, for example, calcium-tin-silver.

14 Claims, 4 Drawing Sheets

METHOD FOR MAKING LEAD-ACID GRIDS AND CELLS AND BATTERIES USING SUCH GRIDS

FIELD OF THE INVENTION

This invention relates to lead-acid cells and batteries and, more particularly, to grids and plates used in making such cells and batteries and to the method of making such grids and plates.

BACKGROUND OF THE INVENTION

Sealed lead-acid cells (often termed "VRLA" cells, viz., valve-regulated lead-acid) are widely used in commerce today. As is known, sealed lead-acid cells utilize highly absorbent separators, and the necessary electrolyte is absorbed in the separators and plates. Accordingly, such cells may be used in any orientation without electrolyte spillage as would occur with a flooded electrolyte lead-acid battery. Such cells are normally sealed from the atmosphere by a valve designed to regulate the internal pressure within the cell so as to provide what is termed an effective "oxygen recombination cycle" (hence the use of the terms "sealed" and "valve-regulated").

The advantages that are provided by sealed lead-acid cells in comparison to conventional, flooded lead-acid batteries are substantial and varied. Sealed lead-acid technology thus offers substantial benefits by eliminating maintenance (e.g., cell watering), expense (e.g., acid additions and purchases), environmental (e.g., expensive waste treatment systems and air-borne acid mist) and safety (e.g., acid burns) concerns.

It is thus not surprising that sealed lead-acid cells are widely used today for various applications that have widely differing requirements. In one type of application, generally termed as stationary applications, lead-acid cells are used, for example, for load leveling, emergency lighting in commercial buildings, for standby power for cable television systems, and in uninterruptible power supplies. The uninterruptible power supply may be used to back up electronic equipment, such as, for example, telecommunication and computer systems, and even as a backup energy source for entire manufacturing plants. When the principal power supply to the electronic equipment has been cut off, such as during a power outage or other interruption, the sealed cells (typically many electrically connected together) provide a source of reserve power to allow the telecommunication or computer system to remain operational until the principal power supply can be restored. The uninterruptible power supply also will accommodate short, or intermittent, losses in power, so that the function of the electronic equipment will not be impaired during a brief power outage.

In addition, there are many applications where sealed lead-acid cells are used in what are termed as motive power application. Sealed lead-acid cells are thus used as the power source for electric vehicles, fork-lift trucks, and the like.

The performance requirements for these two basic types of applications vary significantly. On the one hand, stationary applications are generally float applications, i.e., the cells are generally on float (i.e., an external voltage supply connected to the cells is held slightly above the cell potential to maintain charge), with an occasional need for a deep discharge when the main power source fails or is otherwise interrupted.

On the other hand, motive power applications require repetitive deep discharges, down to a 80% depth of discharge or even somewhat greater. Suitable cells must thus be capable of enduring repetitive charge-deep discharge-charge cycling regimes for up to 500 cycles or even more. Indeed, it would be desirable to provide cells capable of enduring from 1,000 to 2,000 cycles.

The widely varying requirements for these many applications has presented substantial problems to manufacturers of sealed lead-acid cells and batteries.

This has been further complicated in that, for motive-power applications, the compartment for the motive-power source has most often been designed for the size of batteries using conventional flooded lead-acid batteries.

All of these concerns, and additional concerns, have presented an extremely challenging environment for sealed-lead acid cell and battery manufacturers. This environment has resulted in, to a large extent, custom designs which satisfy particular applications.

Generally, the grids used have been made by gravity casting techniques. It has, however, long been recognized that gravity casting techniques, which are semi-continuous at best, can cause several production problems. In the first place, gravity casting techniques are subject to various problems which result in scrap as well as lack of product consistency and the like. These problems include operator error; wide variation in grid wire thickness and hence overall weight due to mold coating variations and irregularities; substantial material handling in production and difficulty in automating such processes and the accompanying inconsistencies due to human error and the like.

A further complicating factor is the need to provide grids of various sizes so that the capacity and other electrical performance requirements for an individual cell for a particular application can be satisfied. One approach utilized has been to provide a series of grids having essentially constant width while varying the height of an individual grid and the number of plates used in a particular cell to achieve a variety of capacity and other electrical performance requirements. Such grids have been made by utilizing gravity casting and a number of molds.

Potentially, the use of any continuous process like continuous grid casting or other continuous expanded metal fabrication techniques to make battery grids should be capable of minimizing, if not eliminating, one or more of the problems associated with gravity casting techniques. Some of these same considerations are of concern in making lead-acid grids for flooded conventional batteries such as automotive batteries. There has been accordingly substantial interest and effort directed toward the use of such techniques over the years insofar as making grids for automotive-type applications.

Various continuous processes for making wrought grids are known. All of such processes include slitting and expanding steps and often include cold rolling a continuous strip to the thickness desired before such expanding and slitting steps are carried out. It is, however, often difficult to achieve grids having satisfactory microstructures, particularly for positive grids when cold rolling is used.

To avoid such difficulties, one particularly desirable approach utilizes a directly cast strip, i.e., a continuous strip that is directly cast from molten lead alloy into the thickness desired for making the grids. The casting process thus does not include any cold rolling or other reduction in the thickness of the strip from the cast thickness to the thickness desired for making the grid. Equipment for making a suitable directly cast alloy continuous strip for molten lead alloy is commercially available (Cominco Ltd., Toronto, Canada). In this regard, U.S. Pat. No. 4,315,357 to Laurie et al.

illustrates, in general, the method and apparatus for making the expanded mesh strip necessary for making a continuously cast grid. Still further, U.S. Pat. No. 3,858,642 to Battiston et al. thus discloses an apparatus for delivering an alloy to a rotating continuous casting drum. U.S. Pat. No. 5,462,109 to Vincze et al. discloses a further method and apparatus for producing metal strips which can be expanded and shaped to form expanded mesh grids for use in plates for lead-acid batteries.

However, the use of such methods and apparatus for producing directly cast strips (i.e., as disclosed in the Vincze et al. '109 patent) has been principally restricted to positive and negative plates for lead-acid batteries which are significantly thinner than the plate thicknesses required for industrial battery stationary and motive power applications. More particularly, the use of directly cast strips has principally concerned making starting, lighting and ignition grids which typically have a thickness of less than about 0.040 inch. In contrast, for industrial battery applications, it is desired to utilize grids having a thickness of at least about 0.060 or 0.080 inch or so. Indeed, long-life, stationary power applications often require grid thicknesses of at least 0.120 inch and even greater. Typically required grid thicknesses for industrial applications thus range from about 0.060 to 0.120 inch for positive grids and from about 0.060 to 0.100 inch for negative grids.

Yet, despite the well known shortcomings of gravity casting and the knowledge of continuous processes for making grids for automotive applications, it is not believed that a suitable continuous process has been developed for making grids and plates for industrial cell/battery applications. There accordingly is a need which exists for grids for industrial lead-acid cells and batteries which can be made in a continuous fashion.

It is accordingly a principal object of the present invention to provide a commercially viable process for making grids suitable for lead-acid cells for industrial cell/battery applications using continuous grid manufacturing methods.

A further object provides a continuous process for making grids which can achieve grids of varying sizes so as to accommodate the electrical performance requirements of a wide variety of applications.

Other objects and advantages of the present invention will become apparent as the following description proceeds. While the present invention will be described herein principally in connection with making grids and plates for VRLA sealed lead-acid cells and batteries, it should be appreciated that this invention is equally applicable to making grids and plates for flooded electrolyte cells and batteries designed for use in industrial battery applications. Such applications are known, and some have been discussed herein. Indeed, the present invention is useful for making thick grids and plates for any desired lead-acid cell/battery application. Even further, the present invention may be used to make thick metal strips for any application.

SUMMARY OF THE INVENTION

The present invention is, in general, predicated on the discovery that a continuous method of making grids of thicknesses suitable for industrial battery applications can be achieved. Thus, it has been found that the directly cast strip/expanded metal process currently used for making the thinner grids for SLI batteries can be successfully used to make the thicker grids for industrial applications. It has thus been found that satisfactory industrial grids can be made when the appropriate process parameters are controlled, including those achieving uniform solidification across the entire strip which is being directly cast.

DETAILED DESCRIPTION OF THE INVENTION

Figure 1:
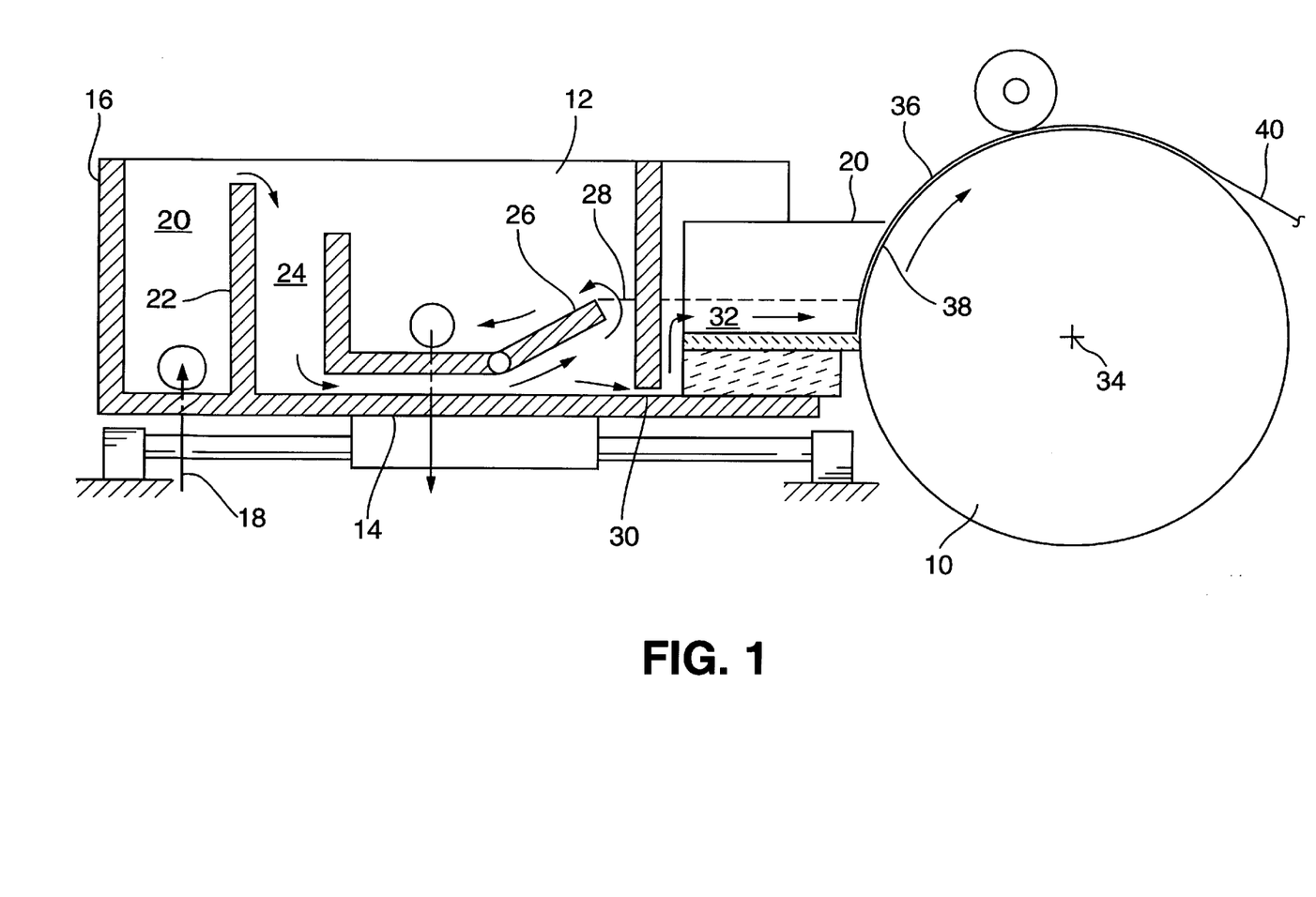
FIG. 1 is a schematic view of an apparatus for forming the thick directly cast strips used to make the industrial battery grids of the present invention.

The grids of the present invention are made using what is termed the "melt-drag method" disclosed in U.S. Pat. No. 5,462,109 to Vincze et al. As shown in FIG. 1, this utilizes a casting drum 10 and a tundish 12. The tundish 12 is defined by a horizontal bottom 14, end wall 16 and two parallel side walls. The tundish has an inlet, up-spout 18, for the introduction of molten lead alloy to feed chamber 20 defined by end wall 16 and turbulence plate 22. Molten lead alloy passes over a weir defined by the top of turbulence plate 22 into diverting chamber 24. Adjustable weir 26 controls the surface height of molten lead alloy as shown at 28. Gap 30 allows molten alloy to flow into the casting chamber 32 to a height equal to height 28 in chamber 32.

The casting drum 10 is rotatable around a horizontal axis 34. The outer circumferential surface 36 of drum 10 is substantially smooth and is conditioned by treating with a medium such as by blasting with glass beads to provide adequate surface structure for the solidification of the molten alloys. Drum 10 is internally cooled with water, using well-known circulating means (not shown).

As the rotatable drum 10 is rotated, an amount of molten alloy is dragged onto its casting surface 38 depending largely on the drum speed and cooling water temperature. The molten alloy solidifies to form strip 40 which usually leaves the drum at about the "twelve to two o'clock" position and finished strip 40 is pulled from the rotating drum 10 by two parallel, rubber-coated pull rollers. The rollers are driven by an adjustable speed motor adjusted to the rotation of the drum 10 to achieve, and preferably continuously maintain, a desired pulling tension on the strip as it is pulled off of the casting surface.

Other details of the method and apparatus are disclosed in the '109 patent. These details are herein incorporated by reference.

Pursuant to the present invention, it has been discovered that, with careful control of the many parameters involved, directly cast strips can be made having thicknesses sufficient for fabricating into grids for industrial cell and battery applications. In addition to modifications necessary in the slitter or strip cutting operation, which will be discussed hereinafter, the strip-forming parameters need to be coordinated to allow the solidified strip to be removed from the casting drum without generated defects being present. More particularly, while directly casting strips of thicknesses satisfactory for industrial battery applications have freedom from some of the problems attendant with casting thinner strips, casting these relatively thick strips is substantially more complex in other respects.

Thus, the casting of relatively thick strips presents considerable difficulty because the alloys that are desired to be used for such applications generally have wide melting points and wide freezing or solidification ranges. Providing appropriate release from the casting drum is likewise complicated by the sheer volume of the molten alloy which needs to be solidified. It is necessary in directly casting such thick strips to insure that the solidification front is uniform across the entire transverse width.

When parameters are not properly controlled, casting lead-based antimonial alloys can cause visually observable cracks extending transversely across the strip width in a haphazard, serpentine fashion (relative to the machine direction). Casting high tin lead-based alloys can result in transverse cracks that literally extend across the entire strip width, thus cutting the strip into discontinuous strip lengths.

Moreover, many industrial applications require a relatively long service life. This magnifies the problem as one defect in a grid can result in failure of the cell or battery.

Accordingly, the blasting process to clean the surface of the casting drum needs to provide a drum surface which is characterized by consistency in the machine direction and across the entire transverse width of the strip to allow release of the solidified strip from the casting drum at the same point. Thus, whether the blasting process is relatively aggressive so as to minimize slippage between the alloy strip being formed and the casting drum, or is relatively mild to promote slippage, the resulting surface should present a uniform consistency. By way of analogy, whether the casting drum surface is like a gravel road or a freshly paved road, the surface should be one or the other, not both. Suitable surface blasting can be achieved by using pressure blasts of various media, such as glass beads.

Another factor which must be taken into account is the extent of the lateral shrinkage of the strip that occurs as solidification takes place. Thus, in contrast to casting thinner strips where slippage between the casting drum surface and the strip needs to be avoided, casting a strip satisfactory for industrial grids requires, it is believed, sufficient slippage to accommodate the lateral strip shrinkage as solidification occurs. It is thus preferred to utilize casting drums having a sufficiently smooth surface to allow the desired slippage. Visual observation of the cast strip for transverse cracks provides satisfactory verification, i.e., the absence of visually observable cracks shows the cast strip is satisfactory. In accordance with this invention, a crack-free directly cast grid means that, during grid formation, none of the diamonds or the like crack open along any one dimension of any diamond.

Typically, process efficiency will make it desirable to maximize the amount of heat transferred out of the strip while maintaining uniformity of such heat removal along the entire strip width. In general, the principal process parameters that should be coordinated are the temperature of the molten lead alloy entering the tundish from the alloy storage receptacle, the casting drum speed and the drum cooling water temperature. With a given lead alloy temperature, faster drum speeds require lower cooling water temperatures, and vice-versa.

A wide variety of useful parameters can be used to make directly cast strips for industrial grids. Given an alloy temperature of 750° F. in the holding vessel, illustrative drum water inlet temperatures which should be useful can range from about 85° F. to 100° F. when coordinated with a casting speed in the range of about 80 to 130 feet/minute.

The cast strip 40 (shown in FIG. 1) is typically slit to the width appropriate for the expander module (which, as discussed hereinafter, converts along the cast strip into the expanded metal grid) is wound into a coil, and then is, with other steps, allowed to cool and age harden before conversion to a grid. The width of the directly cast strip relative to the width of the strip desired for the expander module can vary as desired. Commercial equipment can be used to slit the directly cast strip into four strips, each having a width of about four inches, or so.

According to one aspect of this invention, the slitting operation requires certain spatial relationships so as to avoid undesired defects in the resulting grids. Thus, it has been found that forming thick grids requires adequate clearance during this slitting step so as to avoid altering the grain structure of the thick directly cast strip.

Figure 2:
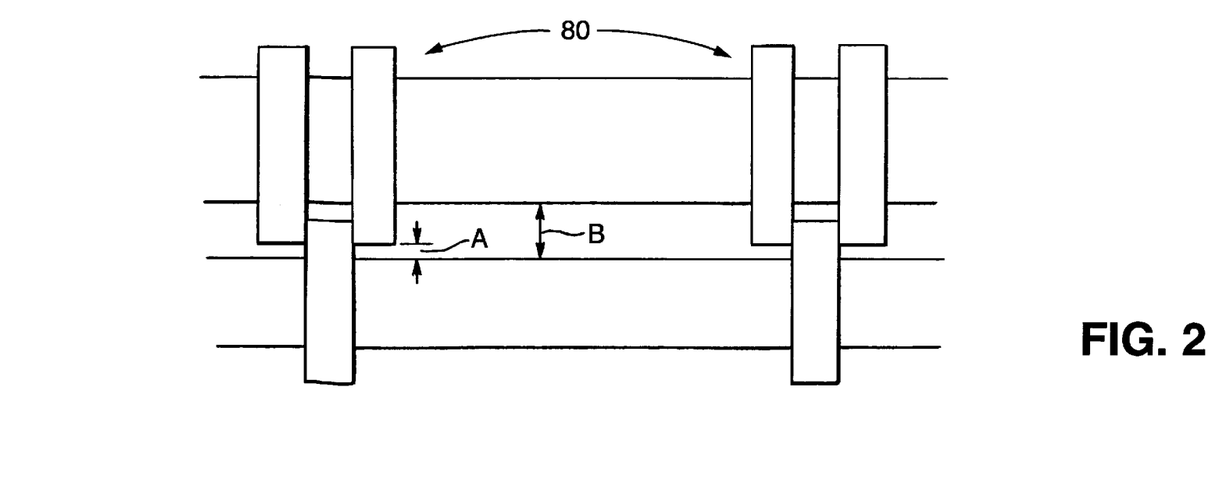
FIG. 2 is a schematic view and showing the geometric and spatial relationships needed in the slitter apparatus (used to slit the cast strip to the desired width for the expander module) to allow making satisfactory industrial battery grids.

To this end, and as is schematically shown in FIG. 2, the assembly of the three cutters, indicated at 42, requires both dimension A (i.e., the distance between the cutter and the main shaft of the roller) and B (the dimension between the respective shafts of the cutters) to be greater than the thickness of the strip being fabricated. Otherwise, the grain structure of the directly cast strip will be undesirably altered.

Figure 3:
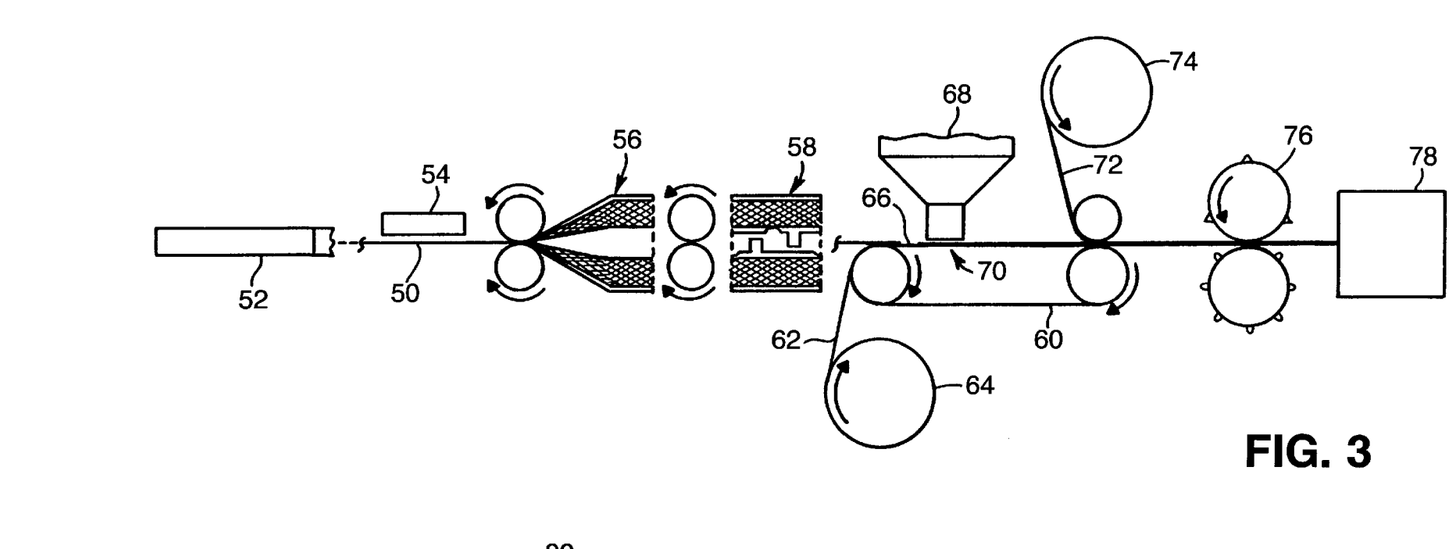
FIG. 3 is a schematic view of one continuous method for making lead-acid grids and plates suitable for industrial battery applications.

FIG. 3 schematically depicts the various steps and equipment utilized in one preferred embodiment of making the industrial grids of the present invention. As previously noted, suitable strip thicknesses are in excess of 0.060 inch and up to about 0.080 inch, even up to about 0.100 inch, and even 0.120 inch. Using the directly cast strips made as shown in FIG. 1, preferably slit as described in connection with FIG. 4, the equipment utilized to make the grids comprises a commercially available continuous expanded battery plate production line (Cominco Ltd., Toronto, Canada), adapted to handle the thick strips. In utilizing this line, the strip is in the form of coils, each coil weighing, for example, about 1,300 pounds or so. Strip 50 from a coil 52 stacked in the horizontal position is continuously fed into the grid expander line. Successive coils can be processed without re-threading by using a strip welder 54 which bonds the end of one coil to the beginning of the next coil. Suitable strip welders can achieve the desired bond with cold pressure.

In the grid expander section, the strip 50 is converted into a grid mesh of the desired size and pattern. In general, the rotary expansion, shown generally at 56, involves an expander tooling module having an assembly of circular cutters mounted on three shafts which cut and preform the strip 50 into an expandable pattern. Center and outside guide protrusions are also cut into the strip which allows engagement by three sets of silent chains in the expansion section. The outside silent chains diverge, causing the mesh to expand away from the center, forming a diamond pattern. As the mesh is expanded, the outside edges elongate more than the center. A stretcher pulls the center portion forward to match the outside edge.

Grid mesh flatteners and coining rollers may be employed to roll the grid expanded mesh to the desired thickness (i.e., flattening out any high spots). Edge trimmers may be used to remove the outside edges of the mesh so as to provide dimensional uniformity and eliminate any ragged or protruding portions.

A tab blanker 58 forms the lug and top frame bar configuration of the plate by punching a slug pattern from the center solid strip. The mesh strip is thus guided through a rotary male/female die assembly which cuts the slugs and ejects them as salvage. A center guide protrusion then is flattened as the grid mesh exits the die set.

This illustrative and preferred embodiment, as previously discussed, forms the top frame bars from the center strip and the bottom frame bars from the two outer strips. This configuration will ultimately result in two sets of plates, staggered in the direction of travel and with the plate lugs facing toward each other. However, it is also within the scope of the present invention to form just one set of plates from the strip, if that is desired. Additionally, it should be appreciated that other configurations could be achieved using the same general process and equipment.

The thus-formed grid mesh strip from the tab blanking step is then continuously moved onto a conveyor belt 60, and active material paste is applied. In the embodiment illustrated, a bottom absorbent paper layer 62 from a roll 64 is positioned between strip 50 and the surface of the conveyor belt 66. Then, positive active material paste from paste hopper 68 is applied to the desired areas of strip 50 in the pasting zone shown generally at 70. Suitable paste-applying apparatus for expanded mesh is known and may be used. As an illustrative example, a suitable paste-applying apparatus is AutoMac 170 Paster (MAC Engineering, Benton Harbor, Mich.).

Suitable positive active material and negative material pastes and densities therefor as well as suitable absorbent materials are known and may be used in the present invention. Of course, as may be appreciated, any absorbent material that is employed in the preferred embodiment of the process of this invention which is desired may be used, as may any desired positive and negative active material paste and density.

After exiting from the pasting zone, in this illustrative embodiment, an optional step positions a top absorbent layer of paper on the upper pasted surface of the pasted plates so as to shroud the pasted plates, the pasted plates being thus sandwiched between the top and bottom absorbent layers. The purpose of using this optional step is to try to lessen any environmental concerns due to lead dust or the like getting into the air. As shown in FIG. 3, a top absorbent paper layer 72 unwinds from roll 74 and is fed onto the upper surface of the pasted strip 50.

Typically, further processing includes, as in the illustrative preferred embodiment, plate parting (or dividing) and flash drying followed by paste curing, as shown in FIG. 3 at 76 and 78, respectively. These steps can be carried out in any order. However, it is preferred to first carry out the plate parting step because the paper present on either side of the pasted grid mesh prevents the cutters used for plate cutting from removing too much paste; and, also, the active material is soft and less susceptible to cutter damage prior to curing.

Plate parting or dividing employs a rotary cutting die which alternately cuts the pasted grid mesh into left and right plates (viewed from the top). The mesh is suitably guided through this step by using an index ring which engages the center lug cut-outs. The divided individual plates go through a rapidly moving conveyor where pasted plates are heated to remove a small amount of surface moisture. Typically, 15–20% moisture from the plates is removed in this step. The flash-dried plates are stacked in plate trays for further paste curing.

Curing can be carried out by any of the many known techniques. In the preferred practice of this invention, curing of positive pasted plates is carried out by using conditions that favor conversion of tribasic to tetrabasic lead sulfate. Such conditions include temperatures of 175° F. up to 210° F. at relative humidities of 95 to 100%.

Further optional processing steps that could be carried out, if desired, include forced drying of such cured plates at temperatures up to 175° F. and low relative humidity to reduce the free lead content to below 3% and reduce moisture to below 3% level. The negative pasted plates, after flash drying, are usually cured at ambient temperatures for up to 72 hours or can be cured at 110°–148° F. and at 95% humidity for 24–48 hours.

As is often done with positive plates, the positive plates of the present invention may be enveloped with any desired separator. However, care should be taken in such an enveloping process since grids and plates made by the expanded technique do not include side bars, and the exposed mesh sides or edges thus present a potential problem as regards puncturing the separator if appropriate care is not taken in the enveloping process. The negative plates can also be enveloped, if desired. Any enveloping procedure, of course, should be carefully done.

Figure 4:
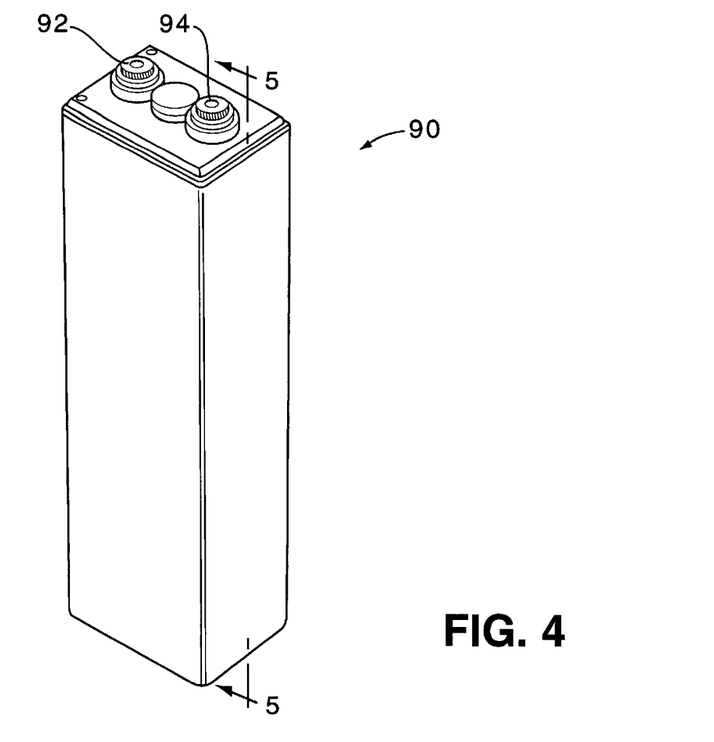
FIG. 4 is an isometric view of a lead-acid cell made using the grids and plates of this invention for such intermediate service life industrial battery cell applications.

FIG. 4 shows an illustrative embodiment of a cell 90 made using the grids and plates of the present invention. Positive and negative terminals 92 and 94 comprise the requisite external terminals. The grids and plates of the present invention may be used with any particular cell construction or battery construction.

Figure 5:
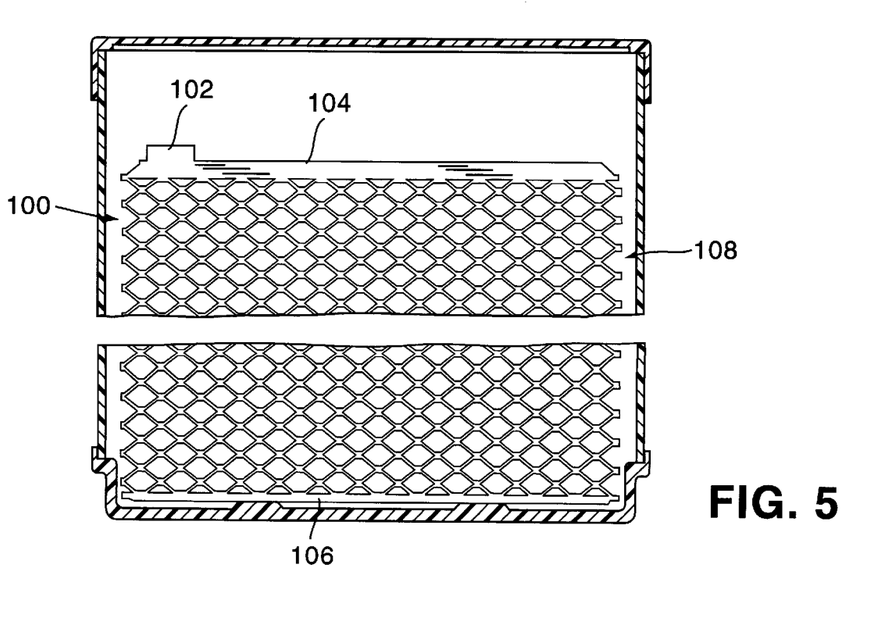
FIG. 5 is a partial cross-sectional view taken generally along the line 5—5 of FIG. 4 and showing the grid configuration.

FIG. 5 illustrates the grid 100 (shown with the active material paste removed so that the grid configuration can be seen) having a lug 102, a top frame bar 104 and bottom frame bar 106, and connecting mesh 108, shown as a diamond-shaped mesh here.

Another preferred method for fabricating industrial grids is described in Kump et al., Ser. No. 08/728,245, filed Oct. 8, 1996, assigned to the assignee of the present invention. In general, in this method, the height of the grid is turned 90° from that in the grid formed using the method of FIG. 3.

Figure 6:
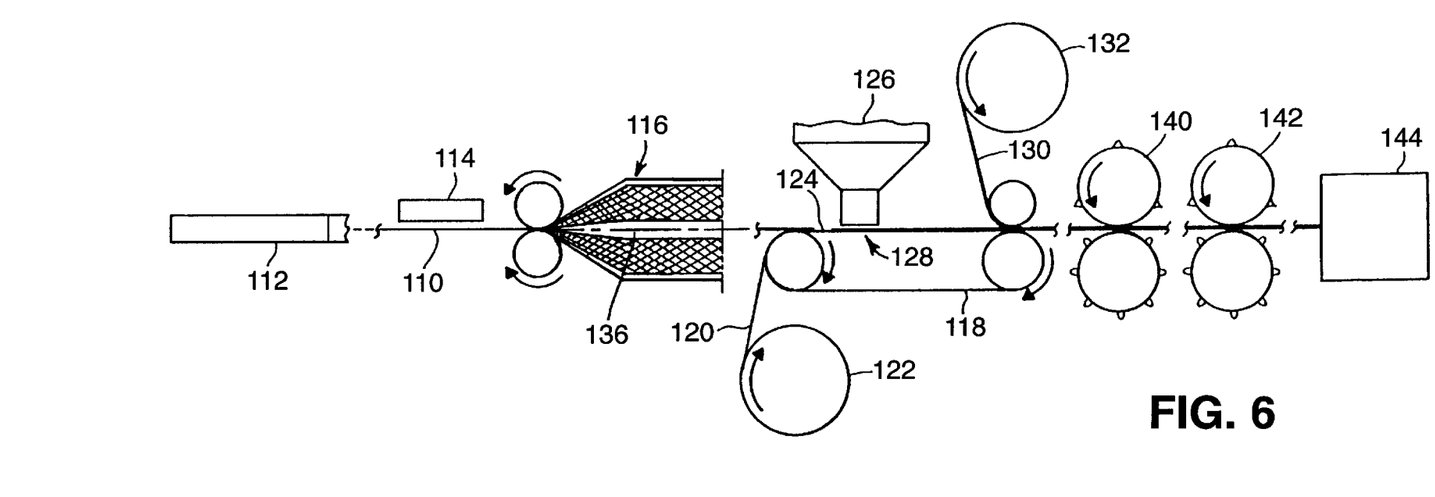
FIG. 6 is a schematic view and illustrating another method for making relatively thick grids for industrial battery applications.

FIG. 6 schematically depicts the various steps and equipment utilized in the Kump et al. method of making such thick grids and plates of the present invention for industrial battery applications. In general, the equipment utilized comprises a continuous expanded cell battery plate production line. In utilizing this line, the strip is in the form of coils. Strip 110 from a coil 112 stacked in the horizontal position is continuously fed into the grid expander line. Successive coils can be processed without rethreading by using a strip welder 114 which bonds the end of one coil to the beginning of the next coil.

In the grid expander section, and as was also described in conjunction with the initial embodiment of a suitable method, the strip 110 is converted into a grid mesh of the desired size and pattern. In general, the rotary expansion, shown generally at 116, involves an expander tooling module having an assembly of circular cutters mounted on three shafts which cut and preform the strip 110 into an expandable pattern. Center and outside grid protrusions are also cut into the strip which allows engagement by three sets of silent chains in the expansion section. The outside silent chains diverge, causing the mesh to expand away from the center, forming a diamond-like pattern. As the mesh is expanded, the outside edges elongate more than the center. A stretcher pulls the center portion forward to match the outside edge.

Grid mesh flatteners and coining rollers may be employed to roll the grid expanded mesh to the desired thickness (i.e., flattening out any high spots). Edge trimmers may be used to remove any edges of the mesh so as to provide desired dimensional uniformity and eliminate any ragged or protruding portions.

As may be appreciated, the extent of expansion will determine the width of an individual grid and may be varied as desired. Likewise, the width of the edge strips, which become the side frame bar or bars, can be varied as desired.

The thus-formed grid mesh strip is then continuously moved onto a conveyor belt 118, and active material paste is applied. In the embodiment illustrated, a bottom absorbent paper layer 120 from a roll 122 is positioned between strip 110 and the surface of the conveyer belt 124. Thus, active material paste from paste hopper 126 is applied to the desired areas of strip 110 in the pasting zone shown generally at 128, desirably restricting the paste application to at least minimize or eliminate paste being applied to the center strip 136. As may be appreciated, center strip 136 ultimately forms the plate lug/side frame bar for the side-by-side plates being made, as will be discussed hereinafter. This pasting may be accomplished by any means desired as is known. Suitable paste-applying apparatus for expanded mesh is known and may be used. As an illustrative example, a suitable paste-applying apparatus is AutoMac 170 Paster (MAC Engineering, Benton Harbor, Mich.). Suitable positive and negative active material paste and density therefor as well as suitable absorbent materials are known and may be used.

After exiting from the pasting zone, in this illustrative embodiment and as was the case in the other method illustrated, an optional step positions a top absorbent layer of paper or the like on the upper pasted surface of the pasted plates so as to shroud the pasted plates, the pasted plates being thus sandwiched between the top and bottom absorbent layers. In this fashion, this optional step may lessen any environmental concerns due to lead dust or the like getting into the air. As shown in FIG. 6, a top absorbent paper layer 130 unwinds from roll 132 and is spread onto the upper surface of the pasted strip 110.

The thus-pasted strip 110 is then cut into individual plates having the desired plate height. As shown in the illustrative process of FIG. 6, which shows making side-by-side plates, the next step involves separating the pasted strip 110 into side-by-side continuous strips. Cutting the cojoint center frame bar defines side-by-side pasted strips. This step defines the width dimension of the individual grids and plates. This separation step can be carried out by any suitable apparatus, such as, for example, by a rotary cutter as indicated at 140 in FIG. 6.

Then, a plate parting step, as indicated at 142, is carried out. The plate parting and lug forming step can be carried out by using a rotary cutting die or punch, or the like, suitable equipment being known. This step defines the height of the plate and forms the grid lug. As may be appreciated, the spacing and timing of the plate parting step should be adjustable so that the height to width ratio of an individual plate can be varied as is necessary to provide plates having a predetermined variation in per plate capacity. This may be conveniently determined as number of Ampere Hours (AH) capacity per positive plate; and, as an illustrative example, for some sealed lead-acid applications, that AH capacity can be rated at positive plate sizes of 58 AH up to 210 AH and even higher.

Then, since the size and AH capacity of the individual plate can be varied as desired, the desired total cell capacity is then achieved by using the number of plates necessary to achieve that desired total cell capacity. This provides a highly versatile approach that satisfies a wide variety of end-use requirements while obtaining the advantages derived from using a continuous process.

Typically, further processing includes, as in the illustrative preferred embodiment, flash drying followed by paste curing, as shown in FIG. 6 at 144. This curing step can be carried out before plate parting. However, it will be generally preferred to first carry out the plate parting step because the paper present, when used, on either side of the pasted grid mesh should prevent the cutters used for plate cutting from removing too much paste; and, also, the active material is soft and less susceptible to cutter damage prior to curing.

The divided individual plates go through a rapidly moving conveyor that is pasted. The plates are heated to remove a small amount of surface moisture. Typically, 15–20% moisture from the plates is removed in this step. The flash-dried plates may then be stacked in plate trays for further paste curing.

Curing can be carried out by any of the many known techniques. Additionally, further optional processing steps that could be carried out, if desired, include force drying of such cured plates to reduce the free lead content and moisture to lower levels.

Figure 7:
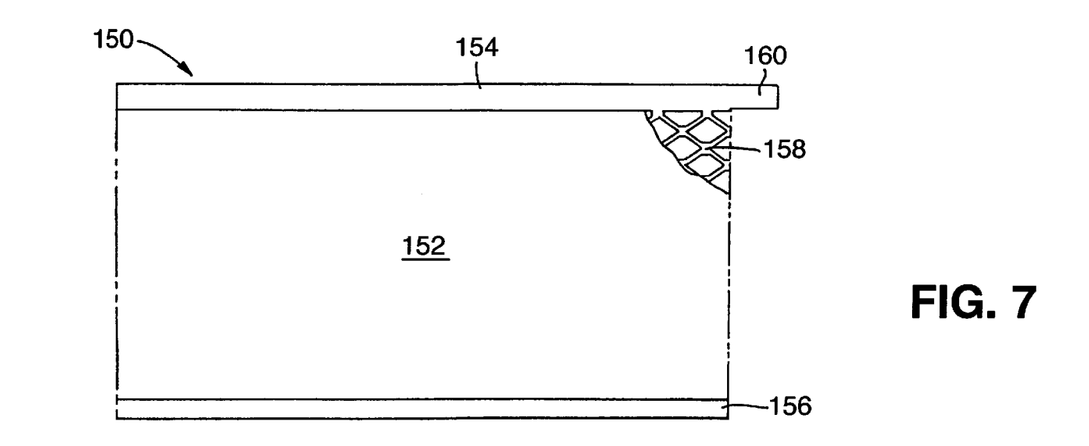
FIG. 7 is a partial side elevation view of a plate made using the process of FIG. 6 with part of the active material being removed to show the structure of the grid.

FIG. 7 illustrates an individual plate 150 having active material 152 thereon made using the method shown in FIG. 6. Part of the active material 152 has been broken away to show the underlying grid which comprises side frame bars 154 and 156 which define the width of the grid and extend from the bottom of the grid to the top. Expanded mesh 158 interconnects side frame bars 154 and 156. Lug 160 is integral with side frame bar 154.

As may be appreciated, the width of plate 150 is determined by the extent of expansion in step 116 (FIG. 6), while the height of the plate (which lies in the direction of travel of the alloy strip in the continuous process of the invention) is determined by the plate parting step 142. Simply by suitable adjustment, a family of grids and plates can be developed, characterized by a constant width and having a height selected to provide the desired capacity of an individual plate. In this fashion, the benefits of a continuous process are obtained; yet, flexibility is allowed so that change from one plate size to a different size can be readily effected.

The plate widths can vary widely as can the height. Typical plate widths are about 5 to 6 inches, while the height in a plate family may vary from about 8 inches to about 28 inches.

A useful capacity range for a family of positive plates to satisfy various industrial battery applications can be from about 30 to 70 and 165 AH.

It should be appreciated that, while this method can be desirably utilized to produce side-by-side plates as in the illustrative embodiment, this method can likewise utilize a strip to produce just one continuing line of plates. This may somewhat simplify the pasting and the plate parting steps. Of course, the production rate is effectively cut in half, which relative rate may even be more desirable where the plate volume required is limited in comparison to, for example, automotive applications.

Similarly, the order in which the various steps of the process are carried out can be varied as desired, consistent with the objective of continuously providing the desired family of cell plates, with the plate height being disposed in the direction of travel of the processing sequence and being capable of being varied as desired.

As far as the positive grids are concerned, one type of the preferred grid alloys comprise lead-based calcium-tin-silver alloys in which, based upon the total weight of the alloy, calcium is present in a range of from about 0.01% to 0.06%, tin is present in a range of from about 0.3% to 1.0% and silver is present in a range of about 0.01% to 0.06%. Optionally, to prevent drossing, aluminum can be included in an amount from about 0.003% to 0.010%.

For the extended service life applications, such as telecommunications, where 10 to 20 years of service are desired, grid alloys imparting high mechanical properties to the resulting grid are preferred. One desirable family of alloys comprises lead-based alloys including about 0.02% to 0.05% calcium, from about 1.5% to 3.0% tin, and from about 0.01% to 0.05% silver. To prevent drossing of calcium, aluminum in an amount of from about 0.003% to 0.010% may be used.

Other suitable positive grid materials include lead and lead-based alloys including lead-tin binary and calcium-tin-lead ternary alloys.

As to the negative grid alloys, suitable alloys include lead-calcium and calcium-tin-lead alloys. Inclusion of tin into the alloy composition decreases the roughness of the cast surface and increases fluidity while imparting strength. Excessive calcium contents tend to yield gritty strips surface finishes.

Thus, as has been seen, the present invention provides a facile process for making lead-acid cell and battery grids on a continuous basis at commercially acceptable rates of production. The grids thus made find substantial utility in sealed lead-acid batteries and in other cells and batteries for industrial applications, obviating the need for making grids using gravity casting techniques which inevitably prove troublesome.

We claim:

1. A lead-acid cell comprising a container, at least one positive plate and a negative plate disposed within said container, a separator disposed within said container and separating said plates, and an electrolyte disposed in said container, said plates comprising a grid supporting structure having a layer of active material pasted thereto, said grid supporting structure having a thickness of at least about 0.060 inch, said grid supporting structure being a directly cast/expanded metal grid having a machine direction and a transverse direction, said grid supporting structure being crack-free.

2. The cell of claim 1 wherein said cell is a sealed, lead-acid cell normally sealed from the atmosphere in service.

3. The cell of claim 2 wherein the positive plates comprise directly cast strip/expanded metal grids having a thickness in the range of from about 0.060 inch to about 0.120 inch.

4. The cell of claim 2 wherein said grid supporting structure comprises a grid having a lug, a top frame bar to which the lug is connected, an expanded grid mesh and a bottom frame, the expanded grid mesh being connected and positioned between the top and bottom frames and having no side frame bars.

5. The cell of claim 4 wherein said grid is a lead-based, calcium-tin-silver alloy having, based upon the total weight of the alloy, from about 0.01% to 0.06% calcium, from about 0.3% to 1.0% tin, and from about 0.01% to 0.06% silver.

6. The cell of claim 5 wherein said alloy includes from about 0.003% to 0.010% aluminum.

7. The cell of claim 2 wherein said grid supporting structure comprises an integral expanded mesh strip having at least one outside frame bar extending vertically to define the height of the plate, and an expanded mesh interconnected thereto.

8. The cell of claim 7 wherein said grid supporting structure has two outside frame bars with the expanded mesh positioned therebetween.

9. The cell of claim 2 wherein the negative plates comprise a directly cast strip/expanded metal grid supporting structure wherein the thickness of said grid supporting structure is in the range of from about 0.06 inch to about 0.10 inch.

10. A directly cast lead strip for a grid for a lead-acid battery, said strip having a thickness of from about 0.06 inch to about 0.120 inch and having a directly cast strip machine and transverse direction, said strip being crack-free.

11. The strip of claim 10 wherein said strip is in the form of a coil.

12. The strip of claim 10 wherein said lead strip comprises an alloy consisting of, based upon the total weight of the alloy, from about 0.01% to 0.06% calcium, from about 0.3% to about 1.0% tin, and from about 0.01% to 0.06% silver.

13. The strip of claim 12 wherein said alloy includes from about 0.003% to 0.010% aluminum.

14. The cell of claim 1 wherein said grid is a lead-based calcium-tin-silver alloy having, based upon the total weight of the alloy, from about 0.02% to 0.05% calcium, from about 1.5% to 3.0% tin, and from about 0.01% to 0.05% silver.

* * * * *

UNITED STATES PATENT AND TRADEMARK OFFICE
CERTIFICATE OF CORRECTION

PATENT NO.   :   5,948,566
DATED        :   September 7, 1999
INVENTOR(S)  :   Larsen and Foote It is certified that an error appears in the above-identified patent and that said Letters Patent is hereby corrected as shown below:

On title page, item

[75] Inventors: Steven R. Larsen, Oakdale; Andrew Foote, St. Paul, both of Minnesota To read:

[75] Inventors: Andrew Foote, St. Paul; Steven R. Larsen, Oakdale, both of Minnesota Signed and Sealed this Twenty-first Day of March, 2000

Attest:

Q. TODD DICKINSON

Attesting Officer

Commissioner of Patents and Trademarks